No. 763,164. PATENTED JUNE 21, 1904.
J. DÖNITZ.
APPARATUS FOR DETERMINING THE LENGTH OF WAVES AND OBSERVING THE OSCILLATIONS IN ELECTRIC OSCILLATION SYSTEMS.
APPLICATION FILED SEPT. 15, 1903.
NO MODEL.
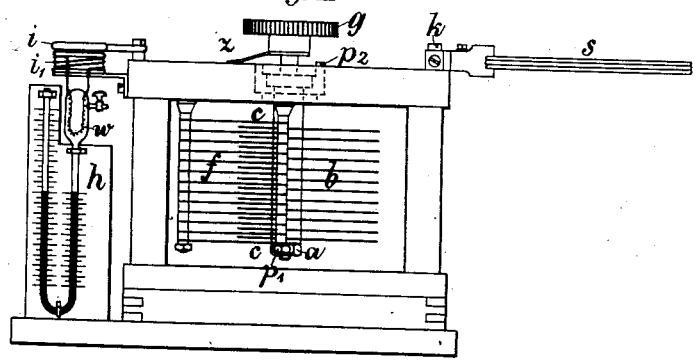
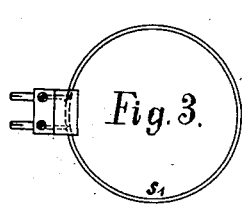
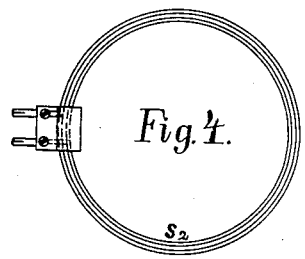
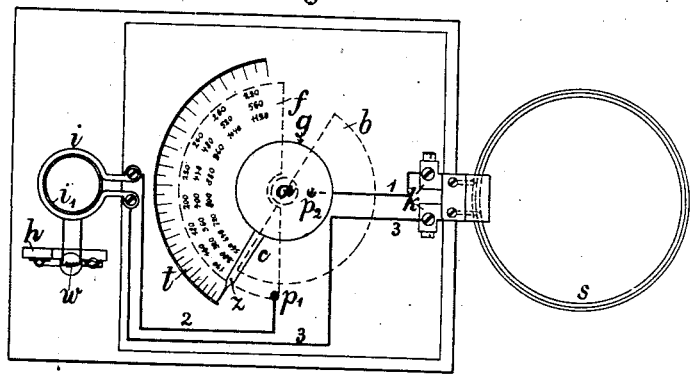

No. 763,164.

Patented June 21, 1904.

UNITED STATES PATENT OFFICE.

JOHANNES DÖNITZ, OF BERLIN, GERMANY, ASSIGNOR TO GESELLSCHAFT FUR DRAHTLOSE TELEGRAPHIE, G. M. B. H., OF BERLIN, GERMANY, A CORPORATION OF PRUSSIA.

APPARATUS FOR DETERMINING THE LENGTH OF WAVES AND OBSERVING THE OSCILLATIONS IN ELECTRIC OSCILLATION SYSTEMS.

SPECIFICATION forming part of Letters Patent No. 763,164, dated June 21, 1904.

Application filed September 15, 1903. Serial No. 173,297. (No model.)

*To all whom it may concern:*

Be it known that I, JOHANNES DÖNITZ, a citizen of the Kingdom of Prussia, residing at Planufer 17, Berlin, Germany, have invented a certain new and useful Improvement in Apparatus for Determining the Length of Waves and Observing the Oscillations in Electric Oscillation Systems, of which the following is a full, clear, and exact description, reference being had to the accompanying drawings, forming a part of this specification.

This invention has for its object an apparatus for the direct measurement of the wave lengths of electric oscillations, as well as the examination of the oscillations in electric oscillating systems. The apparatus for this object has a closed oscillation-circuit which is coupled with the system to be examined in the ordinary manner, electromagnetically, electrostatically, or in any other way, so that it swings with the system to be examined. This cooscillation takes place the more vigorously the better the oscillation-circuit corresponds in its electric values (capacity and self-induction) to the requirements of resonance. Now according to this invention the apparatus is so arranged that one or both of these electric values may be altered immediately within wide limits in a gradual progressive manner, the adjusting arrangement being provided with a reading-off device for the wave lengths corresponding to the actual adjustment as regards resonance and indicating in a current-meter switched into the circuit of oscillation or inductively connected therewith the current strengths arising in the circuit. By this connection of the meter with the adjusting device, which is provided with a direct indicating-scale, it is possible to make the aforesaid observations in a simple and rapid manner, as will be hereinafter explained.

A preferable form of construction of the apparatus, which is characterized by a large measuring capacity with a convenient construction, results if in addition to the gradual and progressive adjustability of one electric value—for instance, the capacity—the other (in this case the self-induction) be made variable (or adjustable) in definite stages, these stages being so calculated that the gradual alteration of the first value can be utilized within the successive stages of the second for the progressive enlargement of the measuring capacity.

In order to explain the matter, an apparatus arranged in accordance with this invention is shown in the accompanying drawings, in which—

Figure 1 is an elevation, and Fig. 2 a plan view, while Figs. 3 and 4 are detail views of parts adapted for interchanging.

The closed oscillation-circuit for the electric waves is formed of self-induction coils or windings $s$ with attachment-terminals $k$; a condenser $c$, which will be hereinafter further described and which has two terminals $p'$ $p^2$; primary windings $i$ of an induction-coil, and connecting-wires 1 2 3.

The condenser $c$ has a series of fixed parallel plates $f$ of semicircular form arranged at uniform distances apart, which are all connected to the terminal $p'$, and a series of similarly-shaped plates $b$, revoluble as a whole on a spindle $a$, which second series is insulated from the first and are all connected with the other terminal $p^2$. When the spindle $a$ is rotated, the series of plates $b$ are gradually brought into the interstices between the fixed series of plates $f$. This rotation is effected by means of a knurled disk or hand-wheel $g$. The electrostatic effective surface of the condenser, and thus the capacity of the oscillation-circuit, varies in value according to the adjustment of the plates. The secondary coil $i'$ of the induction-coil forms with a heat-wire current-meter $h$ an independent circuit, the current proportions of which, on account of its inductive coupling with the oscillation-circuit hereinbefore mentioned, are similar to those of the latter and allow of a direct connection of its circuit with the latter. The action of the current-meter is based on an arrangement by which the heat produced by the current traversing the resistance $w$ of said meter produces an expansion of the surrounding gas and an excess pressure on one side of the U-tube, so that the differences in level of the liquid resulting therefrom gives indications as to the strength of the current flowing through the resistance $w$, and thus also of the strength of current ruling in the actual oscillation-circuit. An indicator $z$ is firmly connected with the handle $g$ of the condenser and when the latter is rotated travels over a scale $t$. The latter is divided in wave lengths in such a way that the indicator each time indicates the length of the waves arising in the oscillation-circuit which corresponds to the actual value of the capacity and the unaltered value of the self-induction. Of course the scale instead of being divided according to the wave lengths may be divided according to number of oscillations. The self-induction coil $s$ is connected with the attachment-terminals $k$ by means of an easily-releasable plug-contact and is capable of being changed for other coils $s'$ $s^2$, (shown in Figs. 3 and 4,) appended to the apparatus. The respective self-induction of these three coils is so calculated that with a suitable change of plugs (coils) the self-induction of the oscillation-circuit is altered in the following proportion: $s':s:s^2 = \frac{1}{4}:1:4$. As these values with their square-root equivalents have an influence on the wave lengths, each graduation of the scale, as will be easily seen, counts with $s$ for a single value, with $s'$ for half a value, and with $s^2$ for double the value of a certain wave length, and as the scale with the coil $s$ has a measuring capacity of L equals two hundred and eighty to five hundred and sixty when the plug is changed to $s'$ it will be reduced until L equals one hundred and forty and when the plug is changed to $s^2$ it will be enlarged until L equals eleven hundred and twenty. These separate measurement values are connected with one another by this grading of the self-induction, so that the apparatus as a whole covers a measurement capacity of from L equals one hundred and forty to eleven hundred and twenty.

The measurements are taken in the following manner: The length of the waves is ascertained by the capacity, and, if necessary, the self-induction, being changed until the current-meter indicates the maximum strength of current. The electric oscillations in the oscillation-circuit being therefore in resonance with the oscillations to be examined, the position of the indicator on the scale then directly gives the actual length of waves. The examination of a given wave-diagram as to whether several waves of different lengths are contained therein and as to what kind they are is effected by observing whether and at what separate adjustments of the apparatus current maxima arise with a continued alteration of the electric capacities of the oscillation-circuit, the respective separate wave lengths being always indicated on the scale for direct reading off and also the amplitudes of the separate waves ascertained in relative amounts from the proportion of the separate movements of the current-meter. Finally, observation as to whether the movement of liquid in the current-meter diminishes rapidly or slowly if the oscillation-circuit undergoes small displacements toward either side from the resonance position enables a sure conclusion to be drawn as to the sharpness of the respective wave.

Having now particularly described and ascertained the nature of my said invention and in what manner the same is to be performed, I declare that what I claim is—

1. An electrical measuring instrument, consisting of a closed resonator calibrated to wave length, substantially as described.

2. An electrical measuring instrument, consisting of a closed resonator calibrated to wave length in connection with a current-indicator, indicating the oscillations in the resonator, substantially as described.

3. An electrical measuring instrument, consisting of a closed resonator, means for changing the natural period of the circuit and means for indicating the resultant wave length, substantially as described.

4. An electrical measuring instrument, consisting of a closed resonator including adjustable elements determining the period or frequency of the oscillations, substantially as described.

5. An electrical measuring instrument, consisting of a closed resonator including adjustable elements determining the period or frequency of the oscillations, in connection with a current-indicator which indicates the resonance of the resonator with any adjacent oscillation-circuit, the wave length or period of which is to be measured, substantially as described.

6. An electrical measuring instrument, consisting of a closed resonator including a condenser, the capacity of which may be slowly changed, in connection with a current-indicator, indicating the occurrence of electrical oscillations in the resonator, substantially as described.

7. An electrical measuring instrument, consisting of a closed resonator including a self-induction coil which may be interchanged with coils of greater or smaller self-induction, substantially as described.

8. An electrical measuring instrument, consisting of a closed resonator including a condenser, the capacity of which is slowly changeable and a self-induction coil which may be interchanged with coils of greater or smaller self-induction, means for adjusting the capacity of the condenser, and means for indicating as to wave length the result of the adjustment, substantially as described.

9. An electrical measuring instrument, consisting of a closed resonator including a condenser, the capacity of which is slowly changeable and a self-induction coil which may be interchanged with coils of greater or smaller self-induction, means for adjusting the capacity of the condenser, and means for indicating as to wave length the result of the adjustment, in connection with a heat-wire current-meter which indicates the occurrence of electrical oscillations in the resonator, substantially as described.

10. An electrical measuring instrument for determining the length of waves in systems for space telegraphy, consisting of a closed resonator including adjustable elements determining the frequency of the oscillations in the resonator, in combination with a current-meter which indicates the occurrence of electrical oscillations in the resonator, one part of the latter being inductively or conductively coupled with the oscillating system to be tested, substantially as described.

In witness whereof I hereunto subscribe my name this 31st day of August, A. D. 1903.

JOHANNES DÖNITZ.

Witnesses:
CHAS. L. COLE,
PAUL ARRAS.